No. 710,004. Patented Sept. 30, 1902.
L. S. OSGOOD, Dec'd.
R. L. OSGOOD, Administratrix.
PIPE COUPLING.
(Application filed June 13, 1901.)

(No Model.)

Witnesses
J. F. Pattison
R. S. Yeates

Leonard S. Osgood.
Deceased.
Inventor
Ruma S. Osgood
Administratrix.
By Lehmann & Dalton
Attorneys

UNITED STATES PATENT OFFICE.

RUMA L. OSGOOD, OF TOOELE, UTAH, ADMINISTRATRIX OF LEONARD S. OSGOOD, DECEASED.

PIPE-COUPLING.

SPECIFICATION forming part of Letters Patent No. 710,004, dated September 30, 1902.

Application filed June 13, 1901. Serial No. 64,472. (No model.)

*To all whom it may concern:*

Be it known that I, RUMA L. OSGOOD, a citizen of the United States, residing at Tooele, in the county of Tooele and State of Utah, administratrix of the estate of LEONARD S. OSGOOD, late a citizen of the United States, residing at Tooele, in the county of Tooele and State of Utah, deceased, (as by reference to the duly-certified copy of letters of administration hereto annexed will more fully appear,) do hereby declare that LEONARD S. OSGOOD invented a new and useful Pipe-Coupling, of which the following is a specification.

This invention relates to pipe-couplings; and its object is to provide a device of this character which will be simple in construction, durable, inexpensive in manufacture, and efficient in operation. It is particularly adapted to pipes where a quick and easy coupling or uncoupling of the pipes is desired; and to this end it consists in the construction, combination, and arrangement of parts, as will be more fully described hereinafter.

A further object is to provide a coupling by which the members may be brought together into a locking position by a lateral movement, and thus obviate the necessity of loosening the joints of the pipes by moving them longitudinally.

For a full understanding of the merits and advantages of the invention reference is to be had to the following description and accompanying drawings, in which—

Figure 1:
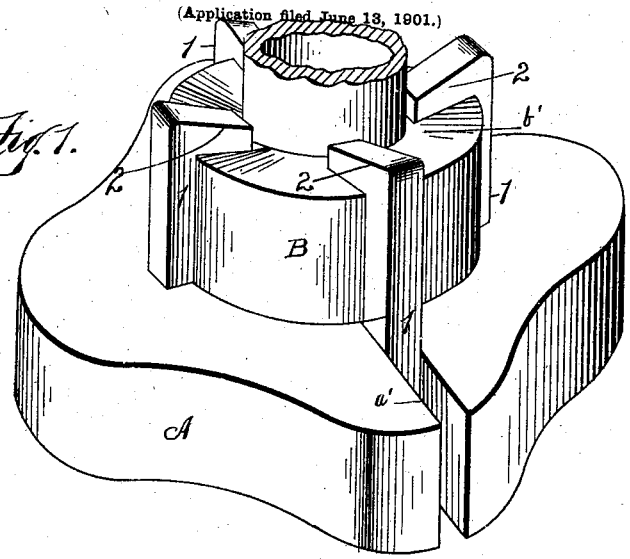
Figure 2:
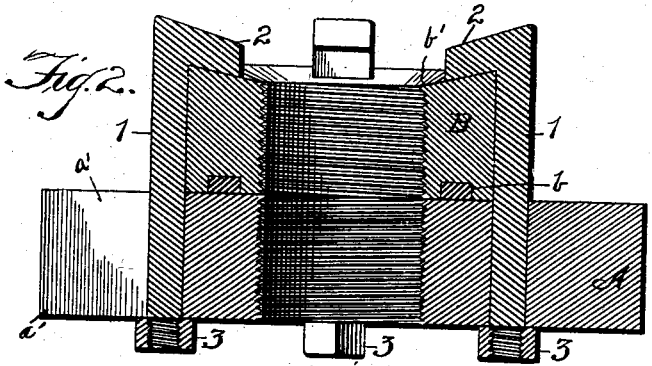
Figure 3:
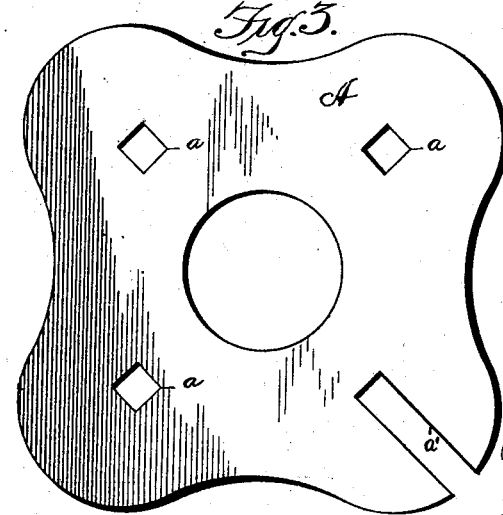

Figure 1 is a perspective view showing the two coupling members secured together. Fig. 2 is a longitudinal sectional view taken through the members when coupled. Fig. 3 is a plan view of the bottom of one of the coupling members detached.

In the drawings, A designates one of the coupling members provided with an interiorly-screw-threaded opening adapted to receive the end of an exteriorly-screw-threaded pipe which is intended to be coupled to an adjoining pipe. The member A is provided at three of its corners with longitudinal apertures *a* and a recess or slot *a'* at the fourth corner thereof.

The member B consists of a ring having an opening provided with interior screw-threads adapted to be screwed upon the end of the exteriorly-screw-threaded pipe adjoining the pipe on which the member A is secured. The inner face of this ring is provided with an annular groove *b*, in which a rubber or leather gasket or other suitable packing means may be inserted and project out sufficiently to contact with the inner face of the member A and be pressed thereagainst when the two are held together, as shown in Fig. 3. The outer face of this ring is dished or beveled from its periphery to the inner edge of the central opening, as shown at *b'*. The apertures *a* are adapted to receive clamping-bolts 1, each provided with a laterally-extended head 2, the lower face of which is inclined downwardly to form an acute angle with the shank portion of the bolt and conform to the shape of the dished portion *b'* on the outer face of the ring B. Three of these bolts are permanently held in the three apertures *a* of the member A and are tightened or loosened upon the member B by means of nuts 3, screwed upon their ends and lying flush with the outer face of the member A. The fourth bolt is adapted to be inserted and removed from the slot or recess *a'* at will, and this bolt is similarly provided with the laterally-extended head 2 and nut 3, which when screwed up tightly against the lower face of the member A and the lateral downwardly-extended head in contact with the dished face *b'* will prevent the bolt from becoming dislodged or removed from the slot.

Presuming each member to be screwed upon the end of a pipe, as shown in Fig. 1, and the three clamping-bolts in position within the openings in the member *a* and it be desired to permanently secure the ends of the two pipes together, the member B is slid beneath the lateral extension of the heads of the clamping-bolts from that end of the coupling provided with the slot. The fourth clamping-bolt may now be inserted within the slot *a'*, and when the bolts are tightened by means of the nuts 3 the downwardly-inclined heads being turned toward the center of the coupling will be brought to bear tightly upon the dished or beveled face *b'*. When the two members are permanently joined, the packing in the groove *b* will contact with the face of the member A and form a water and air tight joint. It will be seen that a reverse operation will detach the parts and that a quick and effective coupling and uncoupling of the pipes is established. It will also be apparent that the life of the packing is prolonged, since no scraping action is caused by the coupling of the two members, as is experienced in couplers of the old type in which the members screw together, and this constant scraping action upon the packing causes it to readily wear or lose its elasticity.

Having thus described the invention, what is claimed is—

1. A pipe-coupling comprising two members, having substantially flat contiguous faces to adapt them to be brought together by a lateral movement, one of said members carrying a plurality of stationary clamping-bolts and a removable clamping-bolt, each of which is provided with lateral offset and downwardly-inclined heads, the other member having an inclined outer face to be engaged by the inclined heads of the clamping-bolts, and means on the bolts to clamp the members together.

2. In a pipe-coupling, the combination of a flanged member having a plurality of transverse apertures and a radial slot, a ring member having its outer face inclined inwardly and downwardly, a plurality of clamping-bolts stationarily mounted in the apertures, a removable clamping-bolt in the slot, each of said bolts having laterally-offset and downwardly-inclined heads, the contiguous faces of the members being substantially flat to adapt them to be brought together by a lateral movement.

In testimony that I claim the foregoing as the invention of LEONARD S. OSGOOD I have hereto affixed my signature in the presence of two witnesses.

RUMA L. OSGOOD,
*Administratrix of the estate of Leonard S. Osgood, deceased.*

Witnesses:
MARITTA BURNHAM,
JOHN F. CORKER.